United States Patent
Covington et al.

(10) Patent No.: US 11,604,059 B2
(45) Date of Patent: Mar. 14, 2023

(54) BLADE FLAP MEASUREMENT PROCESS

(71) Applicant: Bell Textron Inc., Fort Worth, TX (US)

(72) Inventors: Charles Eric Covington, Colleyville, TX (US); Randall Lee Johnson, Grapevine, TX (US); Hunter Barton Nelson, North Richland Hills, TX (US); Michael David Trantham, Arlington, TX (US)

(73) Assignee: Textron Innovations Inc., Providence, RI (US)

( * ) Notice: Subject to any disclaimer, the term of this patent is extended or adjusted under 35 U.S.C. 154(b) by 361 days.

(21) Appl. No.: 16/915,877

(22) Filed: Jun. 29, 2020

(65) Prior Publication Data

US 2021/0403147 A1 Dec. 30, 2021

(51) Int. Cl.
| | |
|---|---|
| *G01B 7/30* | (2006.01) |
| *G01P 3/44* | (2006.01) |
| *B64C 27/57* | (2006.01) |
| *B64D 45/00* | (2006.01) |
| *G01M 5/00* | (2006.01) |
| *B64C 29/00* | (2006.01) |

(52) U.S. Cl.
CPC ............... *G01B 7/30* (2013.01); *B64C 27/57* (2013.01); *B64D 45/0005* (2013.01); *G01M 5/0016* (2013.01); *G01P 3/44* (2013.01); *B64C 29/0033* (2013.01)

(58) Field of Classification Search
CPC .............. G01B 7/30; B64C 27/57; G01P 3/44
See application file for complete search history.

(56) References Cited

U.S. PATENT DOCUMENTS

| | | | | |
|---|---|---|---|---|
| 4,297,076 A | * | 10/1981 | Donham | ............... F03D 7/0276 416/37 |
| 7,083,142 B2 | * | 8/2006 | Scott | ..................... B64C 27/615 244/17.23 |
| 2014/0271188 A1 | | 9/2014 | Dillon | |
| 2019/0023388 A1 | | 1/2019 | Roberts et al. | |
| 2019/0308721 A1 | * | 10/2019 | Kakaley | .................. B64C 27/57 |

OTHER PUBLICATIONS

Rosen, A., et al.; "Mathematical Modelling of a Helicopter Rotor Track and Balance Theory"; Journal of Sound and Vibration, 200(5); Mar. 1997; pp. 589-603.

* cited by examiner

*Primary Examiner* — Reena Aurora
(74) *Attorney, Agent, or Firm* — Shackelford, Bowen, McKinley & Norton, LLP

(57) ABSTRACT

A rotorcraft comprising a rotor blade designed to flap about a hinge point, a measurement system designed to measure blade flapping, and a processing system designed to alter blade flapping measurements. The processing system further comprises a correction process to alter a blade flapping measurement dependent on rotor RPM or rotor torque.

19 Claims, 10 Drawing Sheets

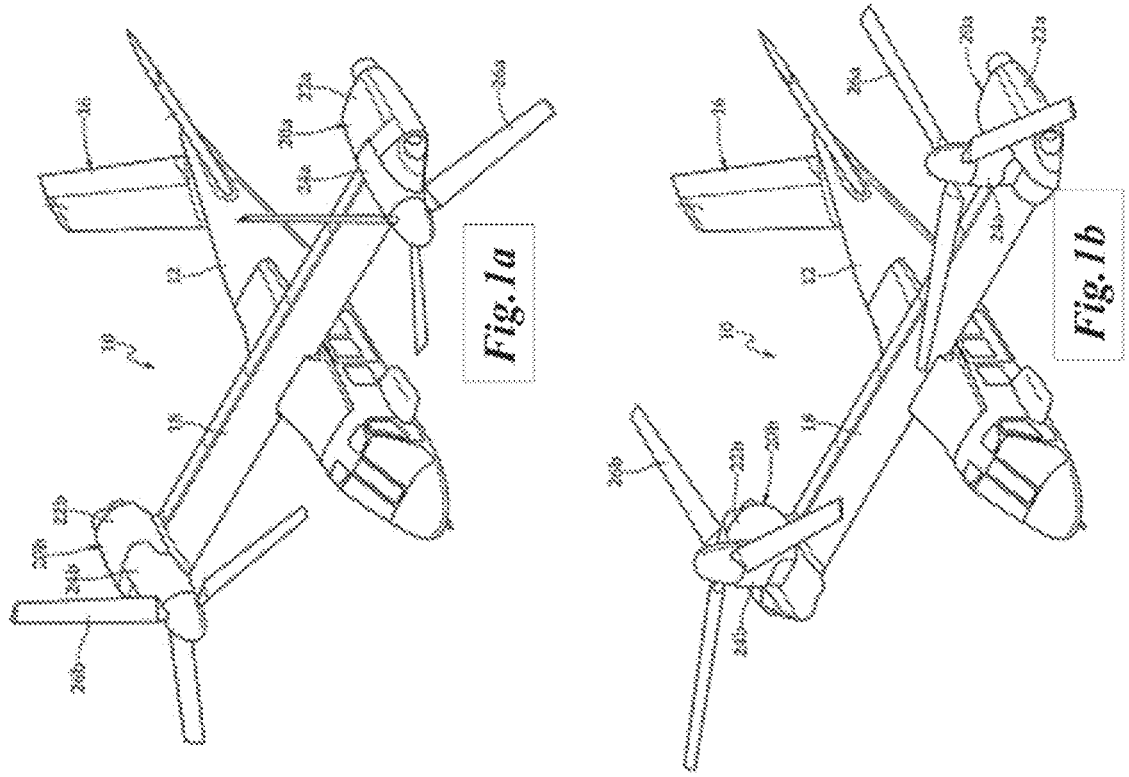

BLADE FLAP MEASUREMENT PROCESS

CROSS REFERENCE TO RELATED APPLICATIONS

Not applicable.

STATEMENT REGARDING FEDERALLY SPONSORED RESEARCH OR DEVELOPMENT

Not applicable.

TECHNICAL FIELD OF THE DISCLOSURE

The present disclosure relates, in general, to a process for improving blade flapping measurements in rotorcraft.

BACKGROUND

An example of an aircraft is a rotorcraft. Rotorcraft use a plurality of spinning rotor blades to generate lift and thrust. In addition to providing lift and thrust, the rotor blades also provide directional control and move the rotorcraft forwards, backwards, and laterally in flight. To provide directional control, the rotor blades have a degree of freedom to move in an up and down motion about a hinge point relative to a plane of rotation of the rotor blade. This motion is generally referred to as blade flapping. As the rotor blade flaps about the hinge point it forms a flapping angle. Generally, a sensor system placed proximate to the rotor blades can provide an approximate flapping angle measurement; but these sensor systems are susceptible to inaccuracies.

BRIEF DESCRIPTION OF THE DRAWINGS

For a more complete understanding of the features and advantages of the present disclosure, reference is now made to the detailed description along with the accompanying figures in which corresponding numerals in the different figures refer to corresponding parts and in which:

FIGS. 1a-1b are schematic illustrations of an exemplary aircraft in forward flight mode and in VTOL flight mode in accordance with embodiments of the present disclosure;

DETAILED DESCRIPTION

Figure 2A:
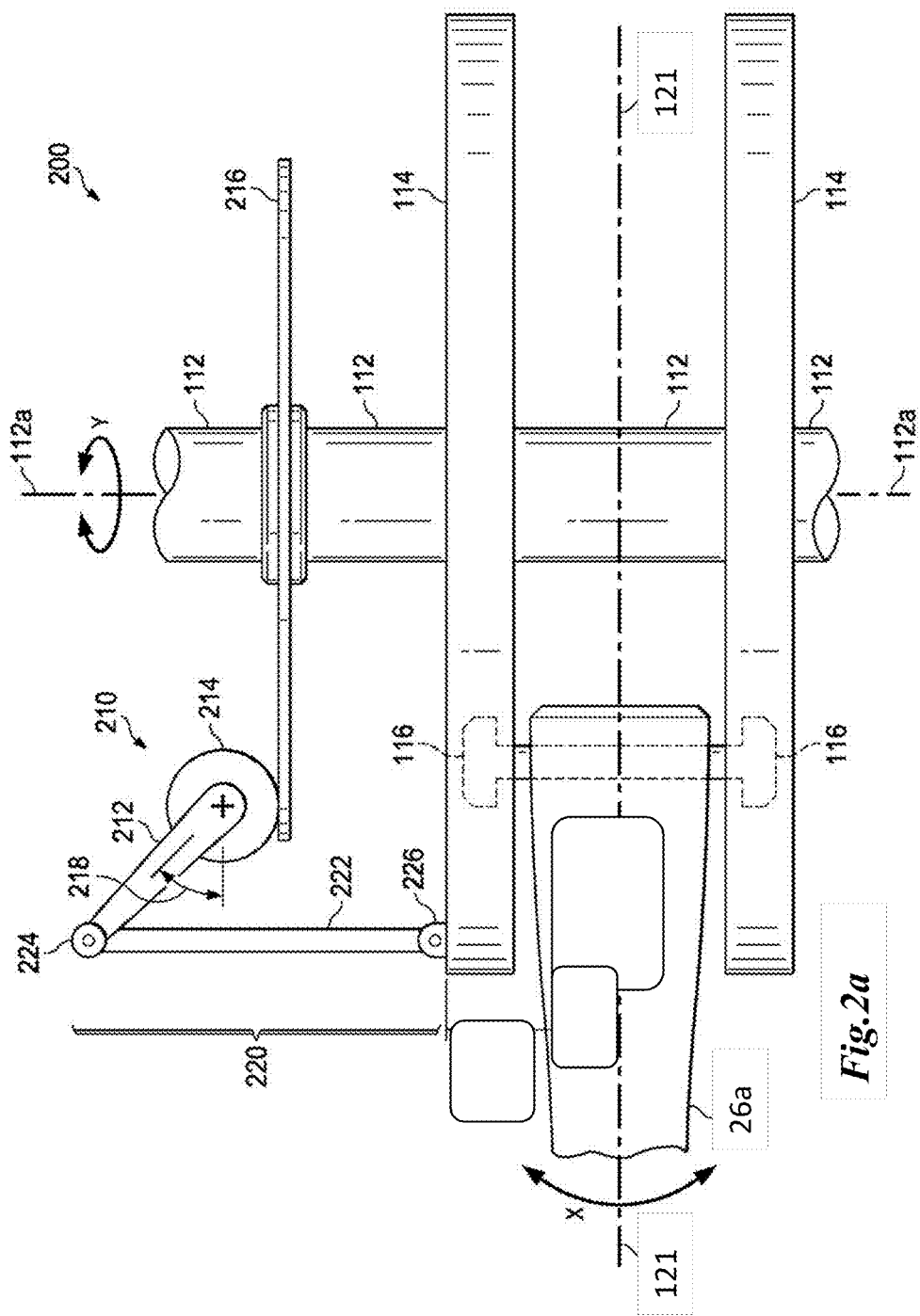
FIG. 2a-2b is a measurement system installed on the proprotor system of FIGS. 1a-1b according to one example embodiment.

While the making and using of various embodiments of the present disclosure are discussed in detail below, it should be appreciated that the present disclosure provides many applicable inventive concepts, which can be embodied in a wide variety of specific contexts. The specific embodiments discussed herein are merely illustrative and do not delimit the scope of the present disclosure. In the interest of clarity, not all features of an actual implementation can be described in the present disclosure. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would be a routine undertaking for those of ordinary skill in the art having the benefit of this disclosure.

In the specification, reference can be made to the spatial relationships between various components and to the spatial orientation of various aspects of components as the devices are depicted in the attached drawings. However, as will be recognized by those skilled in the art after a complete reading of the present disclosure, the devices, members, apparatuses, and the like described herein can be positioned in any desired orientation. Thus, the use of terms such as "above," "below," "upper," "lower" or other like terms to describe a spatial relationship between various components or to describe the spatial orientation of aspects of such components should be understood to describe a relative relationship between the components or a spatial orientation of aspects of such components, respectively, as the device described herein can be oriented in any desired direction. In addition, as used herein, the term "coupled" can include direct or indirect coupling by any means, including moving and/or non-moving mechanical connections.

Referring to FIGS. 1a-1b in the drawings, a tiltrotor aircraft is schematically illustrated and generally designated 10. Aircraft 10 includes a fuselage 12, a wing assembly 18 and a tail assembly 16 each having control surfaces operable for horizontal and/or vertical stabilization during flight. Located at outboard ends of wing assembly 18 are propulsion assemblies 20a, 20b. Propulsion assembly 20a includes a nacelle depicted as fixed pylon 22a that houses an engine and transmission. In addition, propulsion assembly 20a includes a rotor system 24a that is rotatable relative to fixed pylon 22a between a generally horizontal orientation, as best seen in FIG. 1a, and a generally vertical orientation, as best seen in FIG. 1b. Propulsion assembly 20a also includes a rotor blade 26a that is rotatable relative to the rotor system 24a responsive to torque and rotational energy provided via a rotor hub assembly and drive system mechanically coupled to the engine and transmission. Likewise, propulsion assembly 20b includes a nacelle depicted as fixed pylon 22b that houses an engine and transmission, a rotor system 24b that is rotatable relative to fixed pylon 22b and a rotor blade 26b that is rotatable relative to the rotor system 24b responsive to torque and rotational energy provided via a rotor hub assembly and drive system mechanically coupled to the engine and transmission.

FIG. 1a illustrates aircraft 10 in forward flight mode, in which rotor blades 26a, 26b are rotating in a substantially vertical plane to provide a forward thrust enabling wing member 18 to provide a lifting force responsive to forward airspeed, such that aircraft 10 flies much like a conventional propeller driven aircraft. FIG. 1b illustrates aircraft 10 in helicopter or VTOL flight mode, in which rotor blades 26a, 26b are rotating in a substantially horizontal plane to provide a lifting thrust, such that aircraft 10 flies much like a conventional helicopter. It should be appreciated that aircraft 10 can be operated such that rotor blades 26a, 26b are selectively positioned between forward flight mode and VTOL flight mode, which can be referred to as a conversion flight mode.

Additionally, rotor systems 24a, 24b can operate in a low power mode, a full power mode, and an overdrive mode. In low power mode, the rotor systems 24a, 24b rotate at a reduced rate of rotation. Typically, low power mode is used to conserve fuel and energy in less demanding operations. In full power mode, the rotor systems 24a, 24b rotate at a median rate of rotation. Typically, full power mode is used during normal operations. In overdrive mode, the rotor systems 24a, 24b rotate at an increased rate of rotation. Typically, overdrive mode is used in more advanced operations.

Figure 2B:
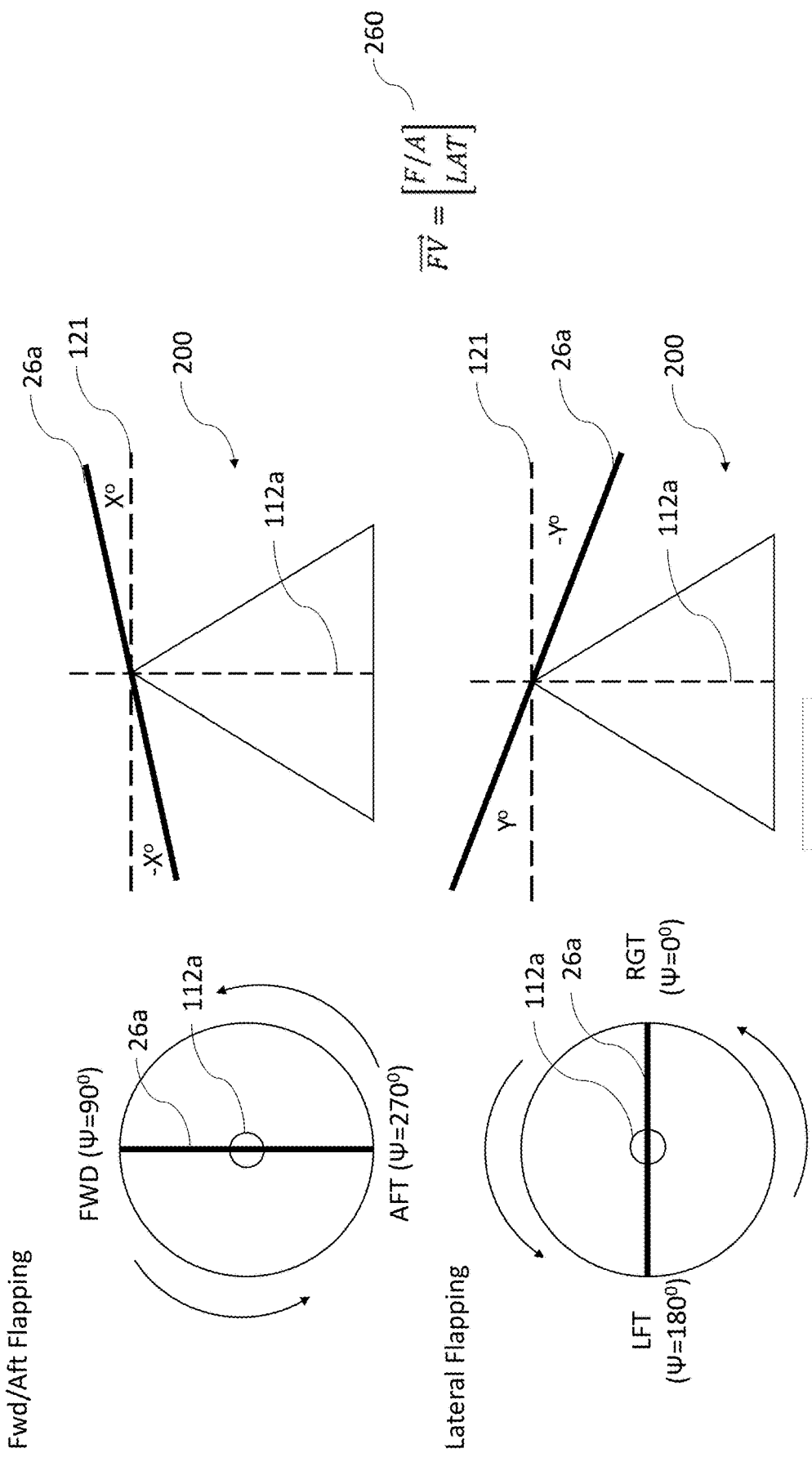

FIGS. 2a and 2b shows an example of a measurement system 200 designed to measure blade flapping, azimuth position, rotor RPM, and rotor torque.

Blade flapping generally refers to the up-and-down motion of the rotor blade 26a relative to a plane of rotation thereof. In FIG. 2a, the rotor blade 26a is shown at a zero-degree flapping position, wherein the rotor blade 26a is centered at a flapping-plane centerline 121. When flapping occurs, the rotor blade 26a deviates upwards or downwards from the flapping-plane centerline 121, resulting in a flapping angle between the flapping-plane centerline 121 and a flapping-plane of the rotor blade 26a.

Azimuth position refers to the location of rotor blade 26a relative to a rotational plane about the rotor axis 112a. The azimuth position is measured with reference to an origin position ($\psi=0$) of the rotor blade 26a. In a counter-clockwise spinning rotor system 24a, the origin position is to the right-hand side of rotational plane. FIG. 2a shows the rotor blade 26a at the left-hand side of the rotational plane at an azimuth position of one hundred eighty degrees ($\psi=180$).

Rotor RPM refers to the rate of rotation of rotor system 24a. More specifically, it's the number or rotations rotor blade 26a makes around the rotor axis 112a in one minute of time. Rotor RPM is variable and will alternate between low power RPM, full power RPM, and overdrive RPM as the rotor system 24a switches between low power mode, full power mode, and overdrive mode, respectively.

Rotor torque refers to a twisting force or moment generated by the rotor system 24a. Rotor torque is variable and will alternate between low power torque, full power torque, and overdrive torque as the rotor system 24a switches between low power mode, full power mode, and overdrive mode, respectively.

The measurement system 200 can be situated within rotor system 24a. Some common components such as slip rings, swashplates, grips, drive links, drive levers, and others are not shown in FIG. 2a. Additionally, only one of three rotor blades 26a is shown. It should be noted that the below discussion of the measurement system 200 is made with reference to the rotor system 24a but is similarly applicable to the rotor system 24b. In FIG. 2, rotor system 24a features a driveshaft 112, a hub 114, and a pin 116. Hub 114 and pins 116 can couple rotor blade 26a to driveshaft 112.

The driveshaft 112 and hub 114 and a power train (not shown) can represent examples of mechanical components for generating and transmitting torque and rotation. The power train can include a variety of components, including an engine, a transmission, and differentials. In operation, driveshaft 112 receives torque or rotational energy from the power train and rotates hub 114 about rotor axis 112a of the driveshaft 112. The rotor blade 26a is coupled to hub 114 by pins 116. Rotation of hub 114 causes the rotor blade 26a to rotate about driveshaft 112.

The measurement system 200 includes a shaft 212, a rotary variable differential transformer (RVDT) 214, and a platform 216. An RVDT 214 is a type of electrical transformer operable to measure blade flapping. Platform 216 supports RVDT 214 and couples RVDT 214 to driveshaft 112. Linkage system 220 includes a linkage 222 and pivot bearings 224 and 226. Pivot bearing 224 couples linkage 222 to shaft 212, and pivot bearing 226 couples linkage 222 to hub 114.

During operation, blade flapping causes upward or downward movement of hub 114. Upward or downward movement of hub 114 causes linkage 222 to move the tip of shaft 212 upward or downward. Moving the tip of shaft 212 increases or decreases a RVDT angle 218, which causes a voltage change (V1−V2) across the RVDT 214. Based on the resulting voltage change, the RVDT 214 can indicate the RVDT angle 218. In some embodiments, a nominal angle can be defined at the zero-degree flapping position of the rotor blade 26a. Blade flapping can then be measured by reference to the nominal angle and angle 218.

Referring again to FIG. 2b, a flapping vector 260 can be derived from the blade flapping measurements collected from the RVDT 214. FIG. 2b shows abstracted top and side views of the measurement system 200, wherein rotor blade 26a is spinning in a full 360-degree azimuth around the rotor axis 112a. The top two portions of FIG. 2b show blade flapping in the forward and aft azimuth positions; and the bottom two portions of FIG. 2b shows blade flapping in the left and right lateral azimuth positions. The blade flapping of rotor blade 26a can be measured at the right lateral ($\psi=0°$), forward ($\psi=90°$), left lateral ($\psi=180°$), and aft ($\psi=270°$) azimuth positions. It should be noted that during normal operations, the rotor blade 26a flaps in a sinusoidal motion as it rotates about the rotor axis 112a. As a result, the blade flapping at the forward azimuth position (X°) is equal and opposite to the blade flapping at the aft azimuth position (−X°). Likewise, the blade flapping at the left lateral azimuth position (Y°) is equal and opposite to the blade flapping at the right lateral azimuth position (−Y°). The entire flapping motion around the rotor axis 112a can be modeled with the flapping vector 260. The flapping vector 260 has an amplitude and direction and is comprised of two components. The first component of the flapping vector 260 is derived from the blade flapping at the forward and aft azimuth positions; and the second component of the flapping vector 260 is derived from blade flapping at the left and right lateral azimuth positions.

Figure 3:
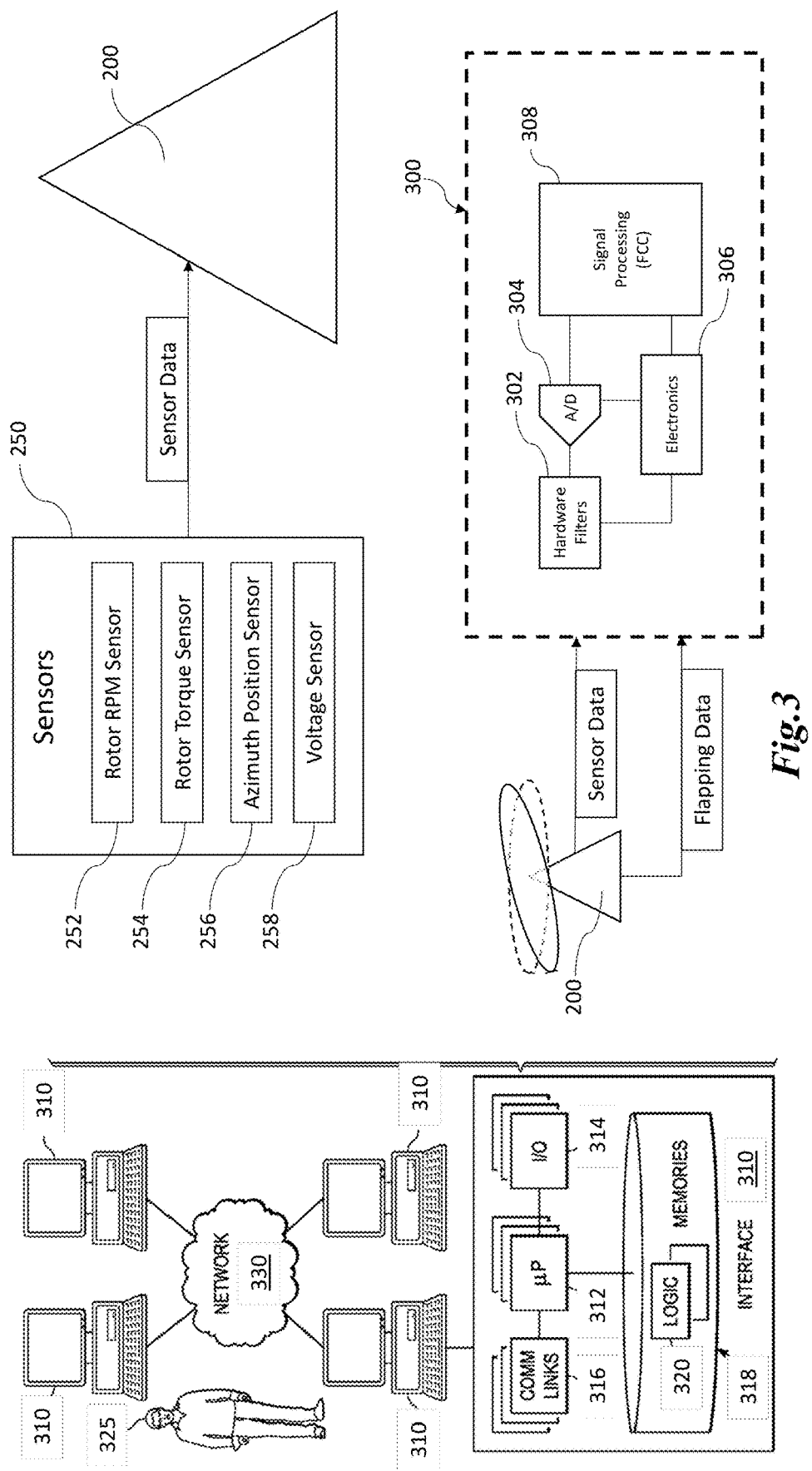
FIG. 3 is a processing system implementing in communication with the measurement system of FIG. 2 according to one example embodiment.

FIG. 3 shows a sensor system 250 in electronic or mechanical communication with the measurement system 200. The sensor system 250 includes an RPM sensor 252, a torque sensor 254, an azimuth position sensor 256, and a voltage sensor 258 designed respectively to measure rotor RPM, rotor torque, azimuth position, and voltage sum (V1+V2) across the RVDT 214. The sensor system 250 can transmit data to the measurement system 200.

In FIG. 3, a processing system 300 in electronic or mechanical communication with the measurement system 200 is shown. The processing system 300 generally includes hardware filters 302, analog-to-digital (A/D) converters 304, electronics 306, and a flight control computer (FCC) 308. It should be noted that the processing system 300 can be altered to communicate with two or more measurement systems. For example, aircraft 10 can have a first processing system 300 in communication with one measurement systems for rotor system 24a and a second processing system for rotor system 24b.

The measurement system 200 can transmit multiple data signals indicative of RVDT voltage change, blade flapping, azimuth position, rotor RPM, rotor torque, and voltage sum. The hardware filter 302, A/D converters 304, electronics 306, and flight control computer (FCC) 308 can then modify and format the transmitted data signals. Specifically, the hardware filter 302 can filter data signals for discrepancies caused by random noise and other errors; the A/D converter 304 can convert data signals from an analog format to a digital format; and the electronics 306 can record and organize all incoming data signals. Finally, the FCC 308 can further process and transmit data signals to a user interface 310 in a format accessible to a user 325.

An initial flapping vector, with an amplitude and direction based on forward and aft and lateral blade flapping, can be calculated by the processing system 300. In turn, a correction process internal to the processing system 300 can further modify the initial flapping vector.

Figure 4A:
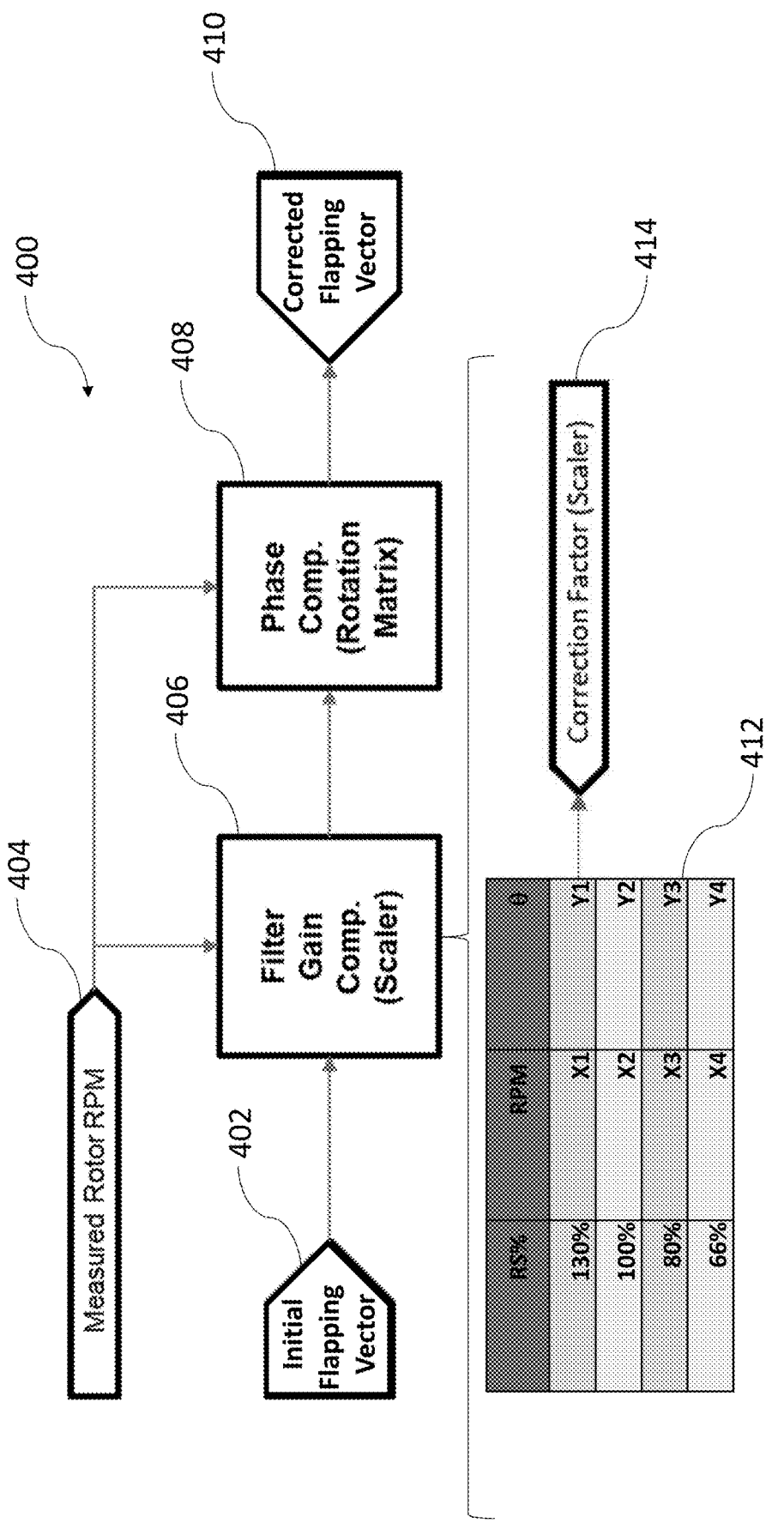
FIGS. 4a-4b is a correction process according to an example embodiment.
Figure 4B:
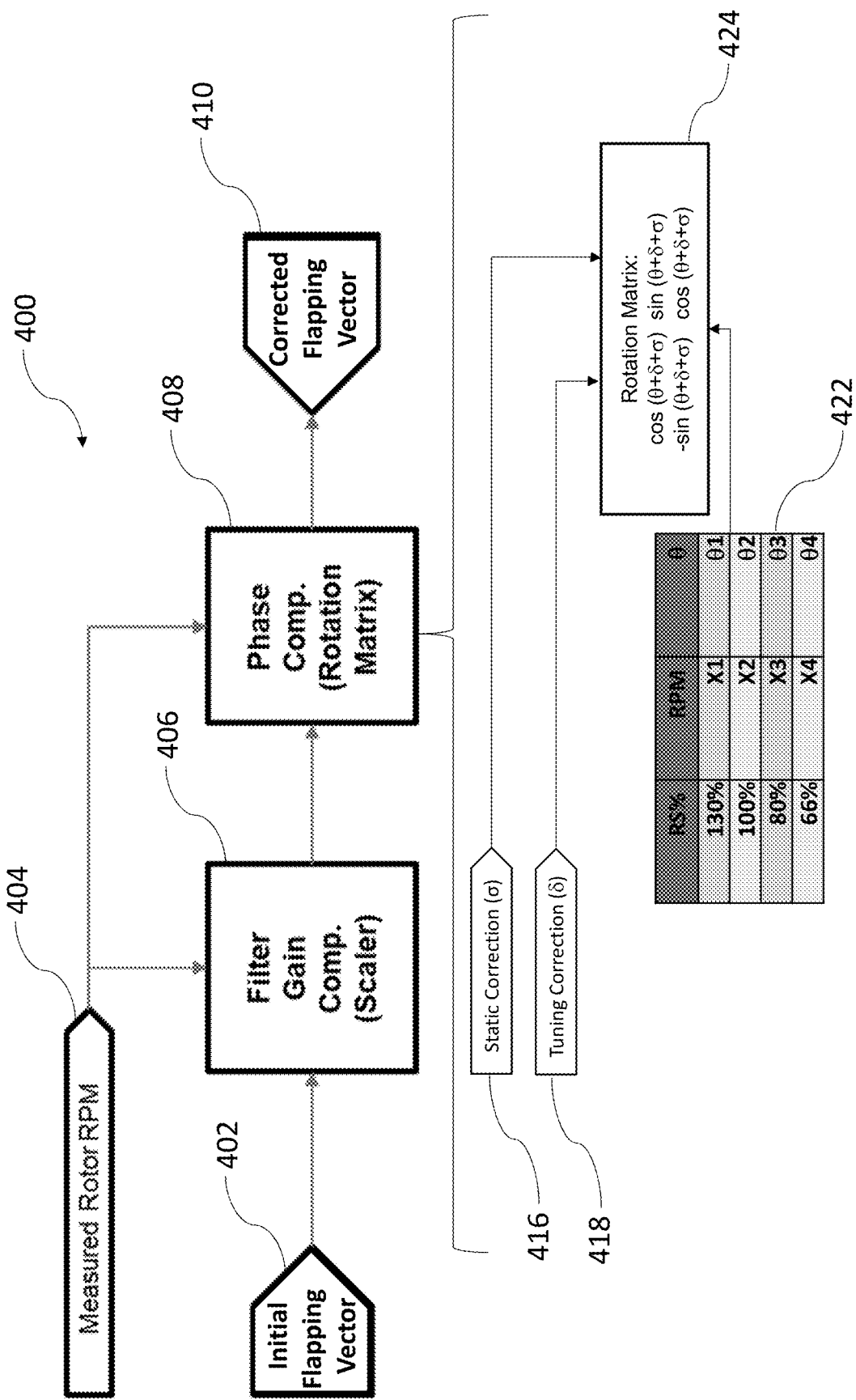

FIGS. 4a and 4b show a first embodiment of a correction process 400, implemented within the processing system 300 to process an initial flapping vector 402 into a corrected flapping vector 410. FIGS. 4a and 4b differ in that FIG. 4a shows details of a filter gain compensator 406 and FIG. 4b shows details of a phase compensator 408. The correction process 400 is generally implemented as an internal process within the FCC 308, but could also be implemented in one or more of the hardware filters 302, the converters 304, or the electronics 306. The correction process 400 could also be implemented throughout the processing system 300. The correction process 400 includes the filter gain compensator 406 and the phase compensator 408.

The initial flapping vector 402 is first processed by the filter gain compensator 406; however, in another flapping correction process, the initial flapping vector could be first processed by the phase compensator 408. Regardless of whether the initial flapping vector 402 is first processed by the filter gain compensator 406 or the phase compensator 408, the resulting corrected flapping vector 410 will remain unchanged.

A measured rotor RPM 404 and the initial flapping vector 402 are input to the filter gain compensator 406. The filter gain compensator 406 scales the amplitude of the initial flapping vector 402 with a scalar correction factor 414. The scalar correction factor 414 is selected from an RPM lookup table 412. The RPM lookup table 412 lists four different scalar correction factors that correspond with four respective rotor RPMs and rotor RPM percentages. The listed scalar correction factors correspond with an overdrive RPM, a full power RPM, and two low power RPMs at respective RPM percentages of 130%, 100%, and 80% and 66%. It should be noted that the RPM lookup table 412 can be altered to include a greater or lesser number of scalar correction factors and respective rotor RPMs and rotor RPM percentages. Based on the RPM lookup table 412, the filter gain compensator 406 selects a scalar correction factor 414 that corresponds with the measured rotor RPM 404. The scalar correction factor 414 can then be used to scale the amplitude of the initial flapping vector 402 dependent on the measured rotor RPM 404. After passing through the filter gain compensator 406, the initial flapping vector 402 can be further processed by a phase compensator 408.

The measured rotor RPM 404 and the initial flapping vector 402 are input to the phase compensator 408. The phase compensator 408 rotates or alters the direction of the flapping vector 402 with a rotation matrix 424. The rotation matrix 424 implements an angle value selected from a second RPM lookup table 422. The second RPM lookup table 422 lists four different angle values that correspond with four respective rotor RPMs and rotor RPM percentages. The listed angle values correspond with an overdrive RPM, a full power RPM, and two low power RPMs at respective rotor system operations of 130%, 100%, and 80% and 66%. It should be noted that the second RPM lookup table 422 can be altered to include a greater or lesser number of angle values and respective rotor RPMs and rotor RPM percentages. Additionally, the rotor RPMs and rotor RPM percentages used by the second RPM lookup table 422 are ideally the same as the rotor RPM and rotor RPM percentages used by the RPM lookup table 412. Based on the second RPM lookup table 422, the phase compensator 408 selects an angle value to be implemented in the rotation matrix 424 that corresponds with the measured rotor RPM 404. The rotation matrix 424 can then be used to rotate the initial flapping vector 402 dependent on the measured rotor RPM 404.

Additional errors in the flapping vector can be corrected by a static corrector 416 and a tuning corrector 418. For example, in rotorcraft with two or more rotor systems, static errors can emerge due to the placement of the rotor systems relative to each other and the fuselage. These static errors can be corrected with the static corrector 416 by using a respective static corrector ($\sigma_1$, $\sigma_2$, $\sigma_3$, . . . ) for each rotor system. Any remaining errors, resulting from random noise or other error sources, can be corrected with one or more tuning correctors ($\delta$) 418.

After the initial flapping vector 402 has been scaled and rotated by the filter gain compensator 406 and phase compensator 408, the resulting corrected flapping vector 410 can be transmitted to an interface 310 in a format that can be accessed by a user 325.

Figure 4C:
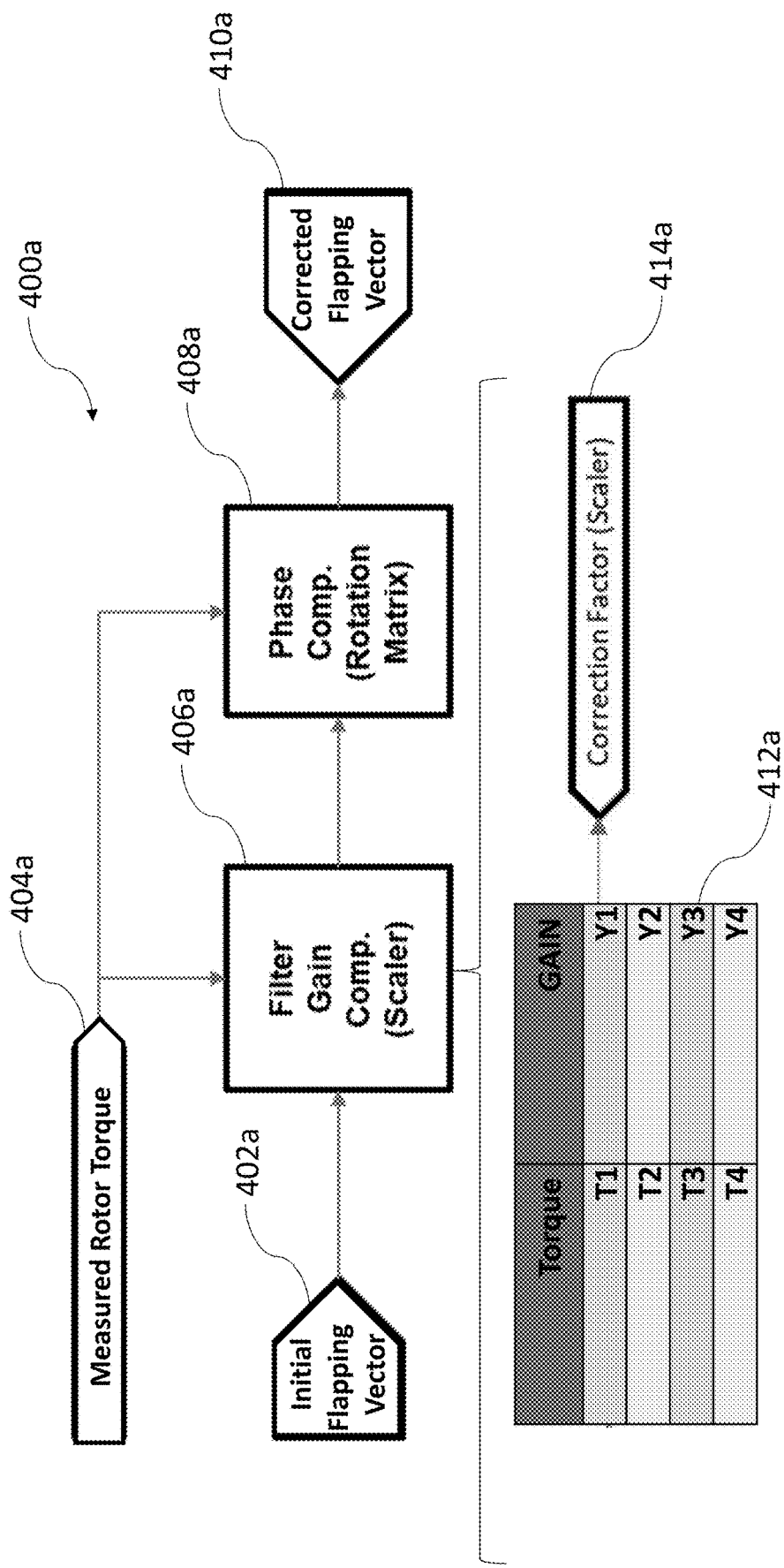
FIGS. 4c-4d is an alternate version of the correction process of FIGS. 4a and 4b according to an example embodiment.
Figure 4D:
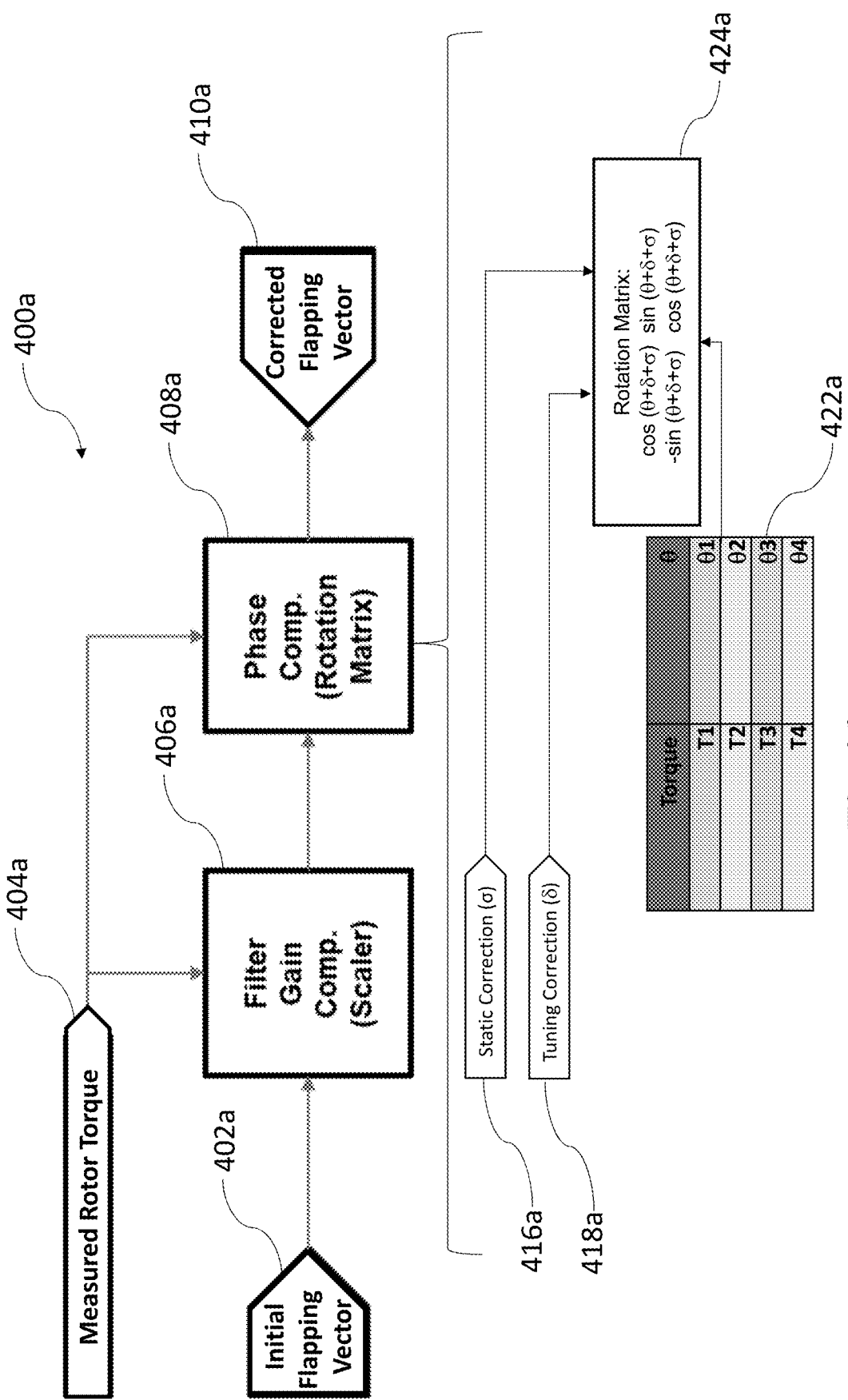

It should be noted that a measured rotor torque can also be used as an alternative to or in conjunction with a measured rotor RPM in a flapping correction process. FIGS. 4c and 4d show a correction process 400a that uses a measured rotor torque 404a rather than the measured rotor RPM 404 to process an initial flapping vector 402a into a corrected flapping vector 410a. The correction process 400a includes a filter gain compensator 406a and a phase compensator 408a. FIGS. 4c and 4d differ in that FIG. 4c shows details of filter gain compensator 406a and FIG. 4d shows details of phase compensator 408a.

The filter gain compensator 406a and phase compensator 408a behave similarly to the filter gain compensator 406 and phase compensator 408 of FIGS. 4a and 4b and can scale the amplitude and rotate the direction of the initial flapping vector 402a. However, the filter gain compensator 406a and phase compensator 408a respectively implement a torque lookup table 412a and second torque lookup table 422a rather than an RPM lookup table 412 and a second RPM lookup table 422. The torque lookup table 412a lists four different scalar correction factors that correspond with an overdrive torque, a full power torque, and two low power torques; and the second torque lookup table 422a lists four different angle values that likewise correspond with an overdrive torque, a full power torque, and two low power torques. The angle values can then be implemented in a rotation matrix 424a. The measured rotor torque 404a can be used to select a scalar correction factor and angle value from the torque lookup table 412a and second torque lookup table 422a. The resulting corrected flapping vector 410a can be transmitted to an interface 310 in a format that can be accessed by a user 325.

Figure 5:
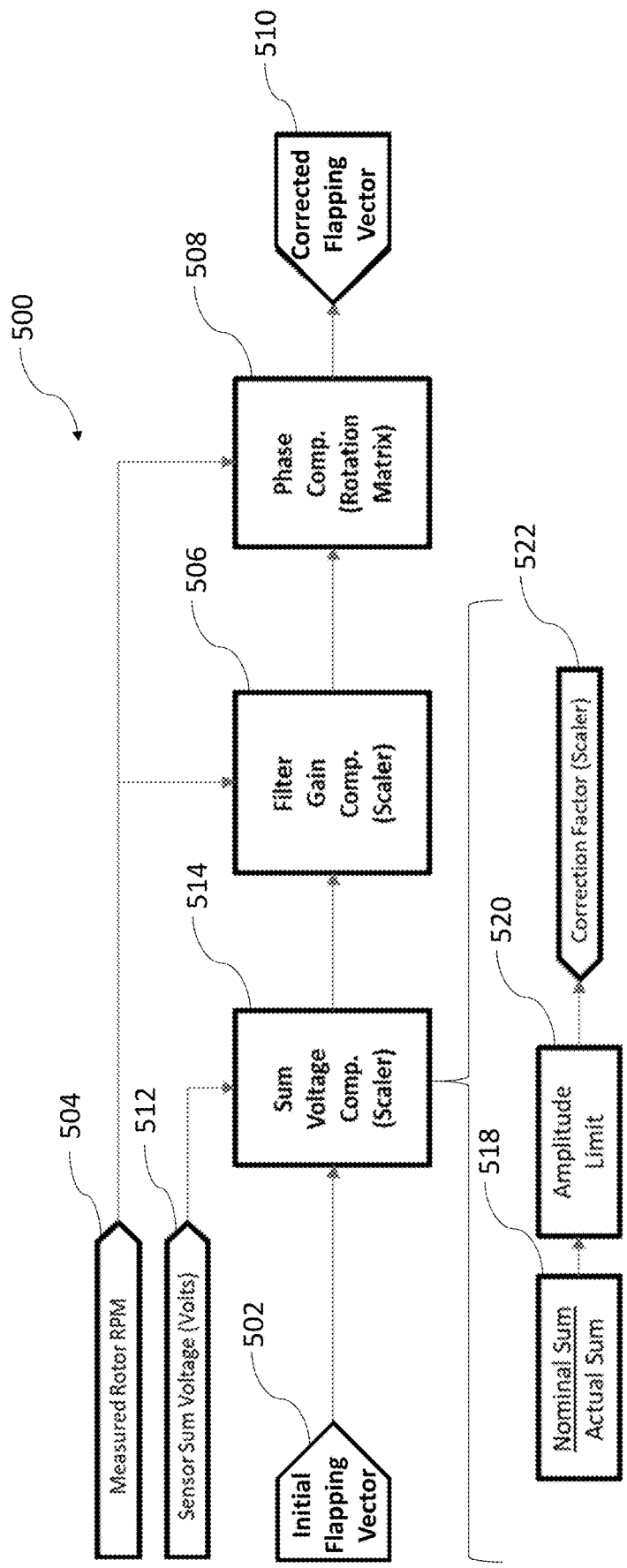
FIG. 5 is a correction process according to an example embodiment.

FIG. 5 shows a correction process 500, implemented within the processing system 300 to process an initial flapping vector 502 into a corrected flapping vector 510. The correction process 500 is generally implemented as an internal process within the FCC 308, but could also be implemented in the hardware filters 302, the converters 304, or the electronics 306. The correction process 500 could also be implemented throughout the processing system 300. The correction process 500 includes a filter gain compensator 506, a phase compensator 508, and a sum voltage compensator 514 that communicate with each other as illustrated in FIG. 5. The filter gain compensator 506 and phase compensator 508 are substantially similar to the filter gain compensator 406 and phase compensator 408 and scale and rotate the initial flapping vector dependent on a rotor RPM 504; however in another embodiment of the correction process, a filter gain compensator and a phase compensator could be substantially similar to the filter gain compensator 406a and phase compensator 408a and scale and rotate the initial flapping vector dependent on a rotor torque.

In FIG. 5, the initial flapping vector 502 is first processed by the sum voltage compensator 514; however, in other embodiments of a flapping correction process, the initial flapping vector 502 could be first processed by the filter gain compensator 506 or the phase compensator 508. Regardless of whether the initial flapping vector 502 is first processed by the filter gain compensator 506 or the phase compensator 508, the resulting corrected flapping vector 510 will remain largely unchanged.

In FIG. 5, the sum voltage 512 of an RVDT inputs to the sum voltage compensator 514. Ideally, the sum voltage 512 should be constant and equal to a known nominal sum; however due to sensor errors within the RVDT, the actual sum of the sum voltage 512 may not be equal to the nominal sum. To account for any errors that result in a deviation from the nominal sum, a ratio 518 between the nominal sum and actual sum is calculated by the sum voltage compensator 514. An amplitude limit 520 is then applied to the ratio 518 to limit the effects of erroneous data on the result. A scalar correction factor 522 is then calculated from the resulting ratio. The scalar correction factor 522 can then be used to scale the amplitude of the initial flapping vector 502 dependent on the sum voltage 512.

After the initial flapping vector 502 is scaled by the sum voltage compensator 514 and the filter gain compensator 506 and is rotated by the phase compensator 508, the resulting corrected flapping vector 510 can be transmitted to an interface 310 in a format that can be accessed by a user 325.

Figure 6:
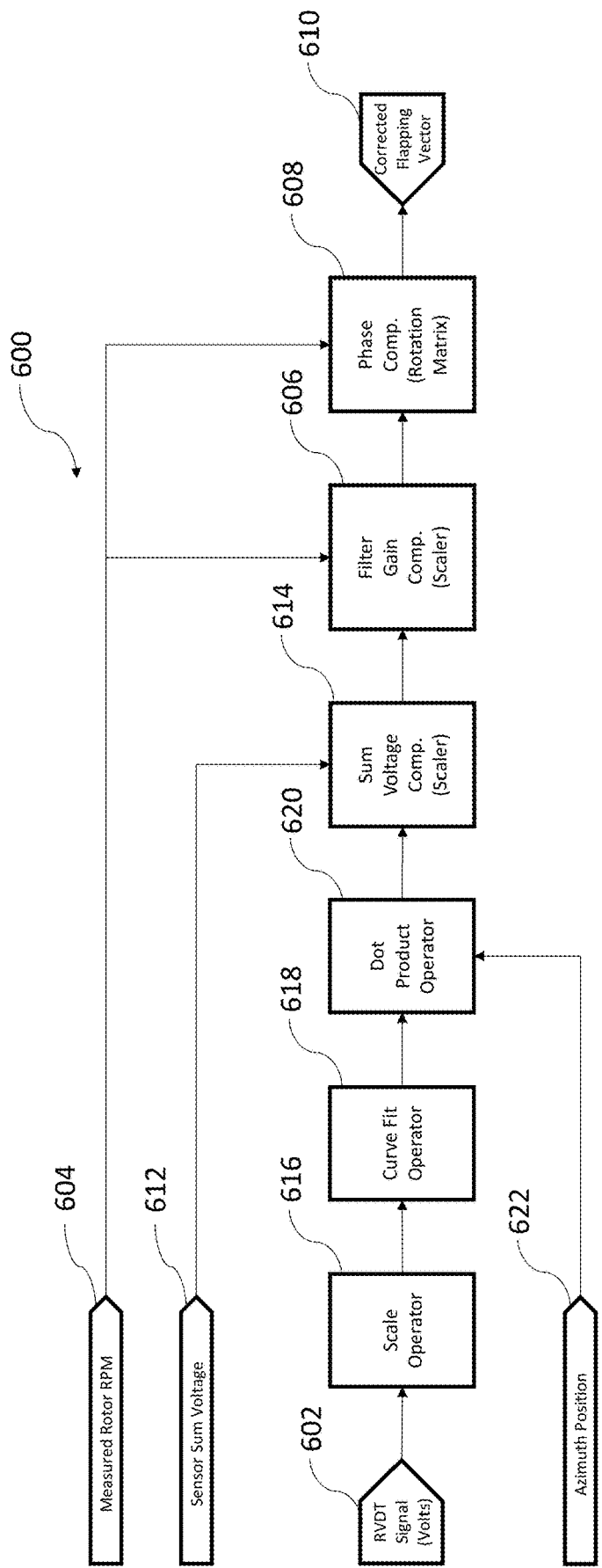
FIG. 6 is a correction process according to an example embodiment.

FIG. 6 shows a correction process 600, implemented within the processing system 300 to process a RVDT voltage signal 602 into an initial flapping vector, which is then processed into a corrected flapping vector 610. The RVDT voltage signal 602 is derived from the voltage change (V1–V2) across the RVDT 214. The correction process 600 is generally implemented as an internal process within the FCC 308, but could also be implemented in the hardware filters 302, the converters 304, or the electronics 306. The correction process 600 could also be implemented throughout the processing system 300. The correction process 600 includes a filter gain compensator 606, a phase compensator 608, a sum voltage compensator 614, a scale operator 616, a curve fit operator 618, and a dot product operator 620. The filter gain compensator 606 and phase compensator 608 are substantially similar to the filter gain compensator 406 and phase compensator 408 and scale and rotate an initial flapping vector dependent on a rotor RPM 604; however in an alternate embodiment of the correction process that is not shown, the filter gain compensator and phase compensator could be substantially similar to the filter gain compensator 406a and phase compensator 408a and scale and rotate the initial flapping vector dependent on a rotor torque. Likewise, the sum voltage compensator 614 is substantially similar to the sum voltage compensator 514 and scales the initial flapping vector dependent on a sum voltage 612.

In FIG. 6, the RVDT voltage signal 602 is first processed by the scale operator 616; however, in another embodiment of a correction process that is not shown, the RDVT voltage signal 602 could be processed first by either the curve fit operator 618, the dot product operator 620, the sum voltage compensator 614, the filter gain compensator 606, or the phase compensator 608. Regardless of the order the RDVT voltage signal 602 is processed, the resulting corrected flapping vector 610 will remain largely unchanged.

In FIG. 6, the RVDT voltage signal 602 is transmitted to the scale operator 616, where it is converted to an RVDT angle signal (see angle 218 in FIG. 2a). The RVDT angle signal can then be transmitted to the curve fit operator 618. Based on multiple pre-existing or measured sample points, a non-linear second order curve fit is performed. The curve fit maps RVDT angles to blade flapping angles. Note, higher order curve fits could also be applied if necessary. Based on the second order curve fit, the curve fit operator 618 converts the RVDT angle signal into a blade flapping sample. The blade flapping sample can then be transmitted to the dot product operator 620.

At the dot product operator 620, the blade flapping sample is associated with an azimuth position 622. Note, the azimuth position 622 can be associated with either the RDVT voltage signal 602 or the RDVT angle signal, at either the scale operator 616 or curve fit operator 618.

Multiple blade flapping samples at multiple azimuth positions can be transmitted to the dot product operator 620. A plurality of blade flapping samples can be taken as the rotor blade makes a full rotation around a rotor axis. A dot product can then be performed on all the blade flapping samples across the entire 360-degree azimuth. The resulting dot product can then be used to calculate the forward/aft and lateral components of an initial flapping vector and convert the multiple blade flapping samples and associated azimuth positions into one initial flapping vector. The initial flapping vector can then be transmitted to the sum voltage compensator 614.

It should be noted that, while it is not necessary, it is advantageous in some embodiments to place the dot product operator 620 before the sum voltage compensator 614, filter gain compensator 606, and phase compensator 608. The dot product operator 620 reduces the required processing power, by converting multiple blade flapping samples into a single flapping vector.

After the initial flapping vector has been scaled by the sum voltage compensator 614 and the filter gain compensator 606 and is rotated by the phase compensator 608, the resulting corrected flapping vector 610 can be transmitted to an interface 310 in a format that can be accessed by a user 325.

Referring back to FIG. 3, examples of users 325 include, but are not limited to, a pilot, service person, engineer, technician, contractor, agent, and/or employee. Users 325 can be associated with an organization. An organization can include any social arrangement that pursues collective goals. One example of an organization is a business. A business is an organization designed to provide goods or services, or both, to consumers, governmental entities, and/or other businesses.

Computer system 310 can include processors 312, input/output devices 314, communications links 316, and memory 318. In other embodiments, computer system 310 can include more, less, or other components. Computer system 310 can be operable to perform one or more operations of various embodiments. Although the embodiment shown provides one example of computer system 310 that can be used with other embodiments, such other embodiments can utilize computers other than computer system 310. Additionally, embodiments can also employ multiple computer systems 310 or other computers networked together in one or more public and/or private computer networks, such as one or more networks 330.

Processors 312 represent devices operable to execute logic contained within a medium. Examples of processor 312 include one or more microprocessors, one or more applications, and/or other logic. Computer system 310 can include one or multiple processors 312.

Input/output devices 314 can include any device or interface operable to enable communication between computer system 310 and external components, including communication with a user or another system. Example input/output devices 314 can include, but are not limited to, a mouse, keyboard, display, and printer.

Network interfaces 316 are operable to facilitate communication between computer system 310 and another element of a network, such as other computer systems 310. Network interfaces 316 can connect to any number and combination of wireline and/or wireless networks suitable for data transmission, including transmission of communications. Network interfaces 316 can, for example, communicate audio and/or video signals, messages, internet protocol packets, frame relay frames, asynchronous transfer mode cells, and/or other suitable data between network addresses. Network interfaces 316 connect to a computer network or a variety of other communicative platforms including, but not limited to, a public switched telephone network (PSTN); a public or private data network; one or more intranets; a local area network (LAN); a metropolitan area network (MAN); a wide area network (WAN); a wireline or wireless network; a local, regional, or global communication network; an optical network; a satellite network; a cellular network; an enterprise intranet; all or a portion of the Internet; other suitable network interfaces; or any combination of the preceding.

Memory 318 represents any suitable storage mechanism and can store any data for use by computer system 310. Memory 318 can comprise one or more tangible, computer-readable, and/or computer-executable storage medium. Examples of memory 318 include computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), and/or other computer-readable medium.

In some embodiments, memory 318 stores logic 320. Logic 320 facilitates operation of computer system 310. Logic 320 can include hardware, software, and/or other logic. Logic 320 can be encoded in one or more tangible, non-transitory media and can perform operations when executed by a computer. Logic 320 can include a computer program, software, computer executable instructions, and/or instructions capable of being executed by computer system 310. Example logic 320 can include any of the well-known OS2, UNIX, Mac-OS, Linux, and Windows Operating Systems or other operating systems. In particular embodiments, the operations of the embodiments can be performed by one or more computer readable media storing, embodied with, and/or encoded with a computer program and/or having a stored and/or an encoded computer program. Logic 320 can also be embedded within any other suitable medium without departing from the scope of the invention.

Various communications between computers 310 or components of computers 310 can occur across a network, such as network 330. Network 330 can represent any number and combination of wireline and/or wireless networks suitable for data transmission. Network 330 can, for example, communicate internet protocol packets, frame relay frames, asynchronous transfer mode cells, and/or other suitable data between network addresses. Network 330 can include a public or private data network; one or more intranets; a local area network (LAN); a metropolitan area network (MAN); a wide area network (WAN); a wireline or wireless network; a local, regional, or global communication network; an optical network; a satellite network; a cellular network; an enterprise intranet; all or a portion of the Internet; other suitable communication links; or any combination of the preceding. Although the illustrated embodiment shows one network 330, teachings of certain embodiments recognize that more or fewer networks can be used and that not all elements can communicate via a network. Teachings of certain embodiments also recognize that communications over a network is one example of a mechanism for communicating between parties, and any suitable mechanism can be used.

At least one embodiment is disclosed, and variations, combinations, and/or modifications of the embodiment(s) and/or features of the embodiment(s) made by a person having ordinary skill in the art are within the scope of this disclosure. Alternative embodiments that result from combining, integrating, and/or omitting features of the embodiment(s) are also within the scope of this disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 95 percent, 98 percent, 99 percent, or 100 percent. Moreover, any numerical range defined by two R numbers as defined in the above is also specifically disclosed.

Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention. Also, the phrases "at least one of A, B, and C" and "A and/or B and/or C"

should each be interpreted to include only A, only B, only C, or any combination of A, B, and C.

The invention claimed is:

1. A rotorcraft capable of operating in an overdrive mode, a full power mode, and a low power mode comprising:
   a hub having a hub central axis;
   a rotor blade rotatable relative to a rotor system and coupled to the hub, wherein the rotor blade is articulated relative to the hub central axis to allow the rotor blade to flap;
   a flapping measurement system operable to provide a blade flapping measurement;
   a processing system in communication with the flapping measurement system and operable to perform a correction process to alter the flapping measurement dependent on at least one of a rotor RPM measurement and a rotor torque measurement; and
   wherein the at least one of the rotor RPM measurement and the rotor torque measurement is different in the overdrive mode in which the rotor system rotates at an increased rate of rotation, the full power mode in which the rotor system rotates at a median rate of rotation, and the low power mode in which the rotor system rotates at a reduced rate of rotation.

2. The rotorcraft of claim 1, wherein the correction process converts the blade flapping measurement into a flapping vector with an amplitude and a direction.

3. The rotorcraft of claim 2, wherein the correction process scales the amplitude of the flapping vector with a voltage scalar value derived from a ratio between a nominal voltage sum and actual voltage sum of an electrical transformer.

4. The rotorcraft of claim 3, wherein the electrical transformer is a variable differential transformer.

5. The rotorcraft of claim 1, wherein the correction process scales the amplitude of the flapping vector with a scalar correction factor selected from an RPM lookup table.

6. The rotorcraft of claim 5, wherein the correction process rotates the direction of the flapping vector with a rotation matrix implementing an angle value selected from a second RPM lookup table.

7. The rotorcraft of claim 1, wherein the correction process rotates the direction of the flapping vector with a rotation matrix implementing an angle value selected from an RPM lookup table.

8. The rotorcraft of claim 1, wherein the correction process uses a dot product operator.

9. The rotorcraft of claim 1, wherein the correction process scales the amplitude of the flapping vector with a scalar correction factor selected from a torque lookup table.

10. The rotorcraft of claim 1, wherein the correction process rotates the direction of the flapping vector with a rotation matrix implementing an angle value selected from a torque lookup table.

11. The rotorcraft of claim 9, wherein the correction process rotates the flapping vector with a rotation matrix implementing an angle value selected from a second torque lookup table.

12. A method for modifying a flapping measurement for a rotor blade the method comprising:
    measuring a flapping angle and a rotor RPM; and
    processing the flapping angle into a flapping vector having an amplitude and a direction; and
    altering the flapping vector dependent on the rotor RPM.

13. The method of claim 12, comprising scaling the amplitude of the flapping vector with a scalar correction factor selected from an RPM lookup table.

14. The method of claim 13, comprising rotating the direction of the flapping vector with a rotation matrix implementing an angle value selected from a second RPM lookup table.

15. The method of claim 12, comprising rotating the direction of the flapping vector with a rotation matrix implementing an angle value selected from an RPM lookup table.

16. A measurement system comprising:
    sensors providing a blade flapping measurement and a rotor RPM measurement;
    a processing system that processes the blade flapping measurement into a flapping vector with an amplitude and direction; and
    a correction process that is implemented as an internal process within the processing system, wherein the correction process is configured to alter the flapping vector dependent on the rotor RPM measurement.

17. The measurement system of claim 16, wherein the correction process scales the amplitude of the flapping vector with a scalar correction factor selected from an RPM lookup table.

18. The measurement system of claim 17, wherein the correction process rotates the direction of the flapping vector with a rotation matrix implementing an angle value selected from a second RPM lookup table.

19. The measurement system of claim 16, wherein the correction process rotates the direction of the flapping vector with a rotation matrix implementing an angle value selected from an RPM lookup table.

* * * * *